United States Patent
Kuwahara et al.

(10) Patent No.: US 6,694,142 B1
(45) Date of Patent: Feb. 17, 2004

(54) WIRELESS TERMINAL POSITIONING METHOD AND APPARATUS

(75) Inventors: Mikio Kuwahara, Kokubunji (JP); Ayumu Koide, Yokohama (JP); Katsuhiko Tsunehara, Kokubunji (JP); Nobukazu Doi, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 312 days.

(21) Appl. No.: 09/621,418

(22) Filed: Jul. 21, 2000

(30) Foreign Application Priority Data

Dec. 21, 1999 (JP) .......................... 11-362222

(51) Int. Cl.⁷ .................. H04Q 7/20; G01C 21/26; H04B 7/185
(52) U.S. Cl. ................. 455/456.1; 455/456.3; 455/457; 701/214; 342/357.02
(58) Field of Search ............... 455/456, 457, 455/414, 422; 342/357.01–357.17, 450, 457; 701/214, 213

(56) References Cited

U.S. PATENT DOCUMENTS

| 5,012,424 A | * | 4/1991 | Dodson ................. 364/449 |
| 5,068,795 A | * | 11/1991 | Kamimura et al. ......... 701/214 |
| 5,490,073 A | * | 2/1996 | Kurtsos ................. 364/449 |
| 6,029,121 A | * | 2/2000 | Stashko ................. 702/158 |
| 6,081,231 A | * | 6/2000 | Evans et al. ........... 342/357.13 |
| 6,097,959 A | * | 8/2000 | Yost et al. .............. 455/456 |
| 6,144,918 A | * | 11/2000 | Meng et al. ............. 701/207 |
| 6,167,274 A | * | 12/2000 | Smith ................... 455/456 |
| 6,167,276 A | * | 12/2000 | Pite .................... 455/456 |
| 6,249,252 B1 | * | 6/2001 | Dupray .................. 342/450 |
| 6,252,543 B1 | * | 6/2001 | Camp ................... 342/357.06 |
| 6,295,444 B1 | * | 9/2001 | Morande et al. .......... 455/218 |
| 6,393,292 B1 | * | 5/2002 | Lin ..................... 455/456 |

FOREIGN PATENT DOCUMENTS

JP 07-181242 7/1995

* cited by examiner

Primary Examiner—Duc M. Nguyen
(74) Attorney, Agent, or Firm—Mattingly, Stanger & Malur, P.C.

(57) ABSTRACT

In a wireless terminal position measuring method for estimating the position of a terminal using signals sent from at least three base stations accommodated by a cellular communication system, position of the terminal is estimates according to the triangulation method by selecting three base stations arbitrarily, a plurality of estimated positions thus calculated are stored in a memory and averaged thereafter to obtain a final estimated position.

2 Claims, 6 Drawing Sheets

WIRELESS TERMINAL POSITIONING METHOD AND APPARATUS

BACKGROUND OF THE INVENTION (1) Field of the Invention

The present invention relates to a system for measuring the position of a terminal through cellular communication.

(2) Description of the Related Art

Japan laid-open Patent 7-181242 has disclosed a technology for measuring the position of a terminal by observing the timing of receiving pilot signals from base stations accommodated by a cellular communication system having the code division multiple access (CDMA) method implemented therein. The base stations operate synchronously with satellites included in the global positioning system (GPS).

FIG. 2 and FIG. 3 are concerned with the technology described in the Japan laid-open Patent 7-181242.

FIG. 2 shows a terminal 24 for receiving reference signals 25, 26, and 27 sent from base stations 21, 22, and 23 synchronized with a satellite 20 included in the GPS. FIG. 3 shows an example of the results of correlation.

The terminal 24 correlates the received signals with the patterns of specific codes so as to detect the timings of receiving the reference signals sent from the base stations.

According to the CDMA method, common pilot signals sent from the base stations have specific patterns. The terminal correlates the received signals with the patterns of the pilot signals so as to detect the reception timings.

Each of the base stations adjusts a reference time i by the GPS synchronization and transmits a pilot signal according to a specific transmission timing determined according to the adjusted system time. The specific transmission timing corresponds to an offset time. Information of the offset time is transmitted on a sync channel, and a terminal can acquire the information freely. The terminal calculates a difference between a measured reception timing and the known transmission timing so as to work out a delay time or a time required for propagation of a radio wave.

FIG. 3 shows examples of the results of correlation. The graphs of FIG. 3 are referred to as delay profiles indicating a path along which a signal is propagated with a delay.

The axis of abscesses indicates the reception timing corrected based on the transmission timing, that is, the delay time. The unit of delay time corresponds to each of chips in a spreading code. The axis of ordinates indicates the output or results of correlation operation. A larger correlation value indicates that a signal is received with an indicated delay time spent, that is, a path is determined.

According to the results of correlation, a relative delay time required for a radio wave to reach a terminal after transmitted from a base station can be calculated. The delay time is a relative value because a terminal is unaware of an absolute time instant. A product of an obtained relative delay time by a light velocity indicates a difference between relative propagated distances. Once the difference between relative propagated distances is calculated as to at least three base stations, the position of the terminal can be estimated according to the triangulation method.

Referring to FIG. 4, a method of selecting base stations will be described below. How to select base stations has a significant meaning in measuring a position through cellular communication.

In cellular communication, base stations and a terminal are located on the same plane. Precision in a measured position varies depending on the positional relationships among the base stations and terminal.

FIG. 4 shows the distribution of errors of a measured position when the position to be measured is shifted as 90, 91, and 92 relative to base stations 50, 51, and 52.

Here, it is assumed that a signal transmitted from each of the base stations includes an estimation error of a delay time having a uniform distribution in a range of $\pm 0.2\mu$ sec or less. A black area indicates the spread of errors of each measured position deriving from the intentionally appended error of the delay time. Although the intentionally appended error of the delay time is the same, the spread of errors of the measured position varies depending on the positional relationships among the terminal and base stations. This means that the precision in the estimated position of a terminal varies depending on selected base stations.

SUMMARY OF THE INVENTION

An object of the present invention is to improve precision in estimation.

According to the present invention, the triangulation method is used to calculate a plurality of estimated positions relative to various combinations of three base stations selected from among three or more base stations. The estimated positions are averaged in order to reduce an error of an estimated position.

According to the triangulation method, as shown in FIG. 5, if three unit vectors originated from a terminal towards three selected base stations are added up, an error of an estimated position becomes minimal when the length of the resultant composite vector is zero. As the length of the composite vector gets longer, precision in an estimated position of a terminal deteriorates. As long as the length of the composite vector falls below a certain threshold value, an estimated position contains a small error. As an easy judgment, it may be judged whether a terminal lies within an estimated triangle, that is, whether the length of the composite vector is equal to or smaller than 1, in order to make the judgment for a short period of time by employing a digital computing apparatus.

DESCRIPTION OF THE PREFERRED EMBODIMENTS

Figure 1:
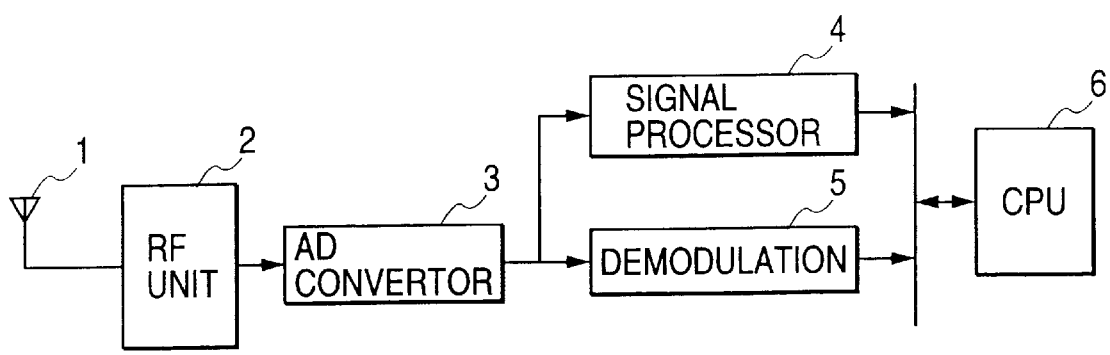
FIG. 1 shows the configuration of a terminal in accordance with the first embodiment of the present invention.
Figure 2:
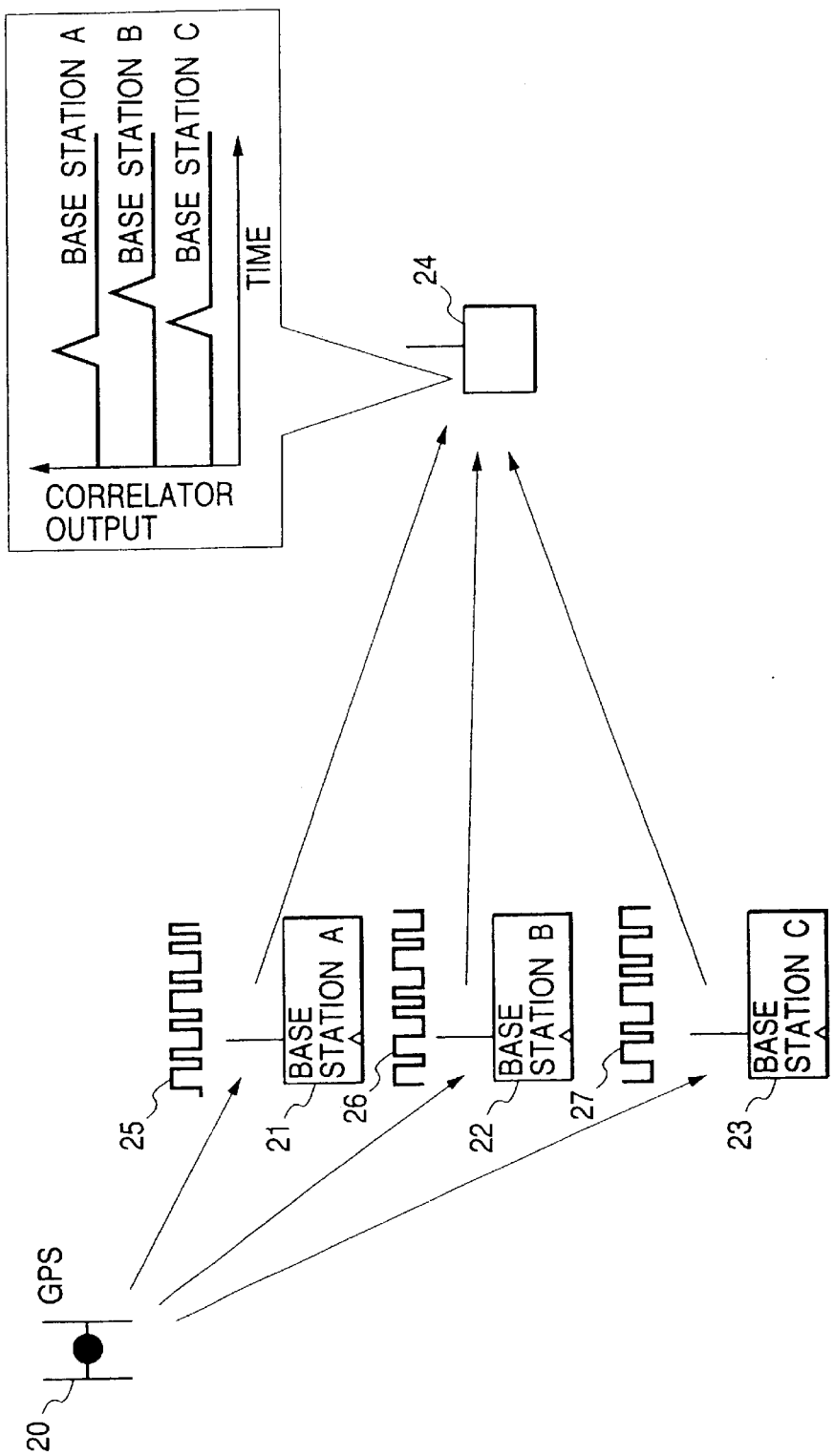
FIG. 2 is an explanatory diagram concerning a related art.
Figure 3:
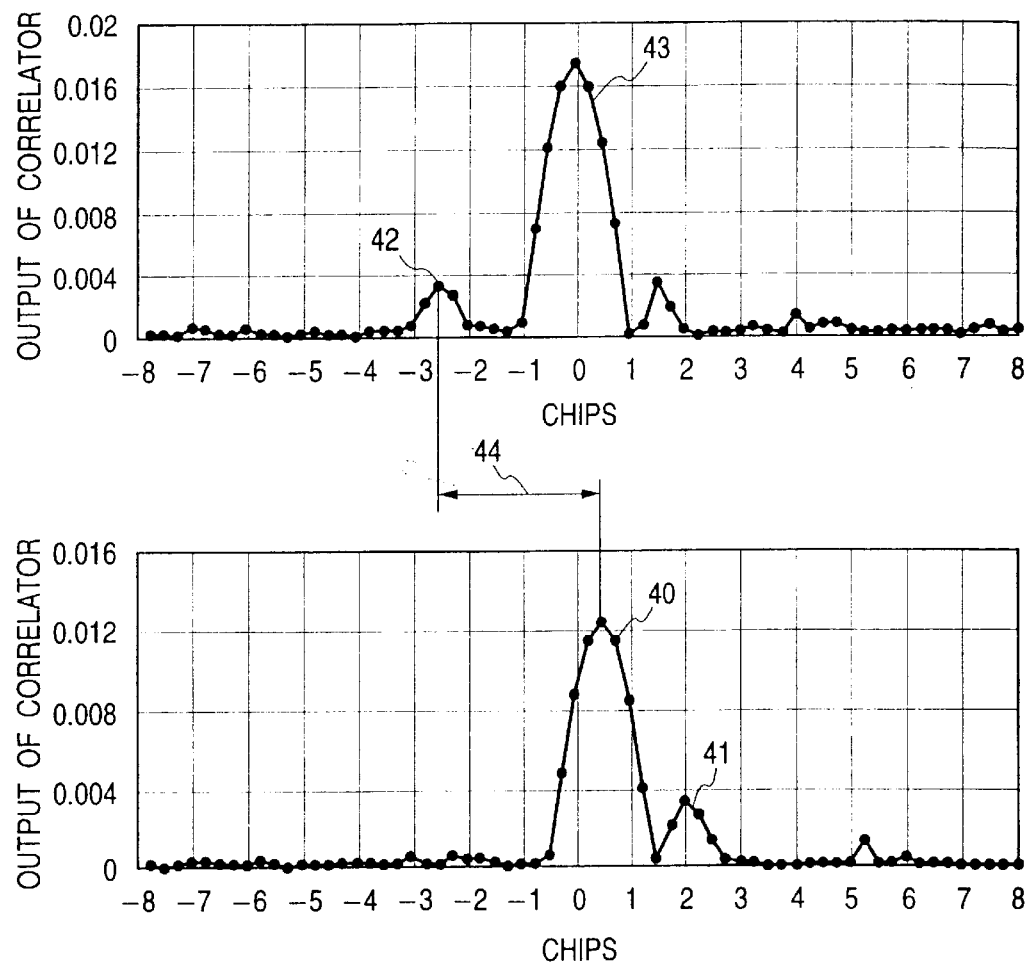
FIG. 3 shows delay profiles obtained in the related art.
Figure 4:
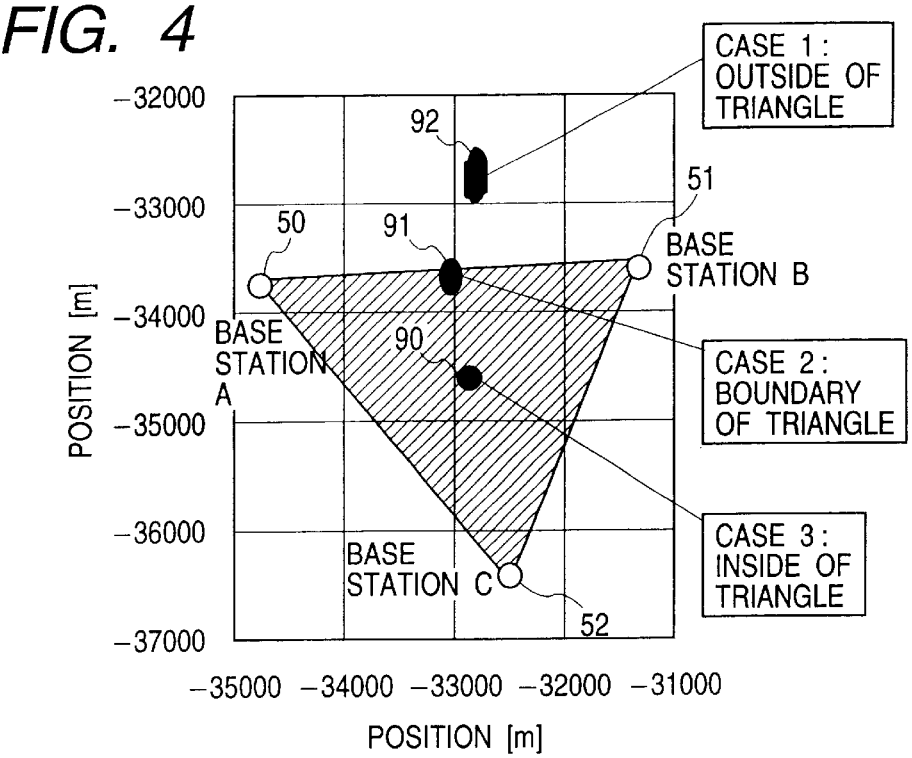
FIG. 4 is an explanatory diagram concerning a problem of the related art.

Referring to FIG. 1, first embodiment of the present invention will be described below.

A signal received by an antenna 1 is converted into a baseband by a radio-frequency unit 2. The converted signal is digitized by an A/D converter 3. A signal processor 4 measures the reception timings of reference signals sent from base stations. The reception timings are obtained through calculation of correlation between the received signals and the reference signals. A demodulator 5 is a unit for receiving information of the base stations.

For example, in a cellular communication system of "cdmaOne" type, the timing of transmitting a reference signal from each of the base stations is drawn out from an offset value in the timing of transmitting a PN code which is transmitted on a sync channel. Thus, the transmission timing can be calculated. A terminal subtracts the transmission timing from the reception timing so as to work out a propagation delay. A CPU 6 estimates a propagated distance from the calculated transmission and reception timings, and then estimates the position of the terminal.

Estimation of a position is carried out by using the following features of cellular communication. That is, a terminal monitors signals sent from a plurality of base stations while the terminal stays at the same position. The propagated distances of signals sent from at least three base stations are measured, whereby the position of the terminal can be estimated according to the triangular method.

When n base stations (where n denotes 4 or more) are observed, three base stations are selected from among the n base stations and the estimated positions $_nC_3$ are calculated. A spatial average of the estimated positions is then calculated in order to reduce an error of an estimated position. The spatial average corresponds to the barycenter of a plurality of calculated coordinates. For example, when two estimated positions (X1, Y1) and (X2, Y2) are calculated, (X1+X2, Y2+Y2)/2 is calculated.

A problem to be overcome is that precision in estimation varies depending on the positional relationships among a terminal and base stations. A substantial improvement of the precision may be achieved by avoiding the selection of base stations that may cause a large error and by averaging estimated positions of the terminal.

Figure 6:
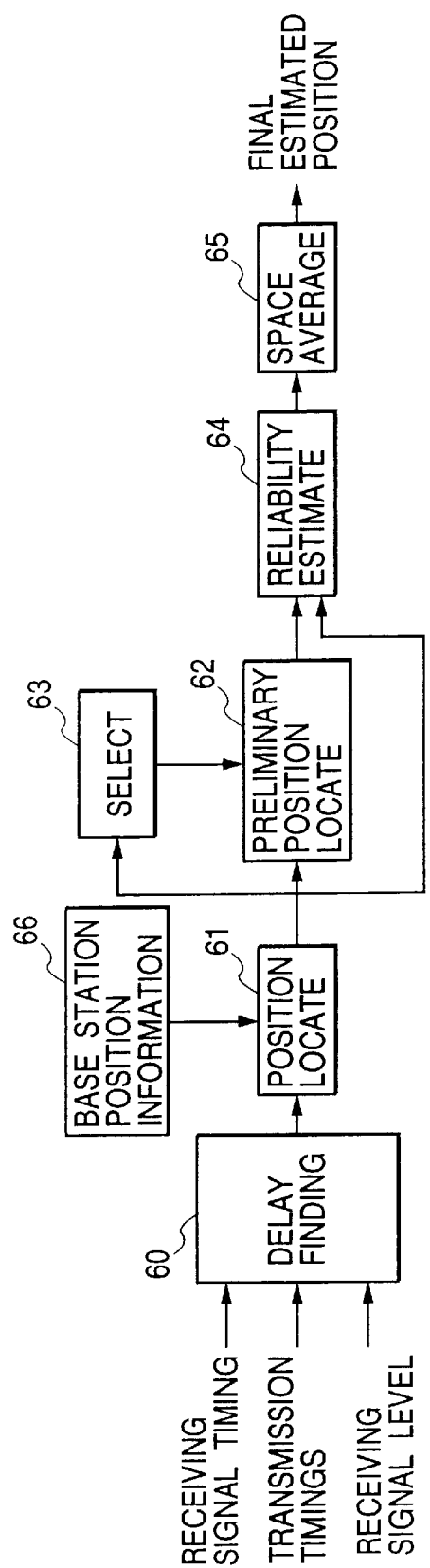
FIG. 6 shows the configuration of a terminal in accordance with the first embodiment of the present invention.

FIG. 6 shows a processing implemented as software in the CPU.

At a delay finding step 60, a difference between the timings of transmitting signals from base stations which are calculated by the demodulator 5 shown in FIG. 1 and the timings of receiving the signals from the base stations which are calculated by the signal processor 4 so that relative delays are calculated. At a position locating step 61, the position of a terminal is calculated, according to the triangular method, using position information 66 of the base stations, which is prepared in advance, and the calculated relative delays, thereby to obtain estimated positions $_nC_3$.

At a preliminary position locating step 62, a spatial average of the plurality of estimated positions is calculated and regarded as a tentative position. At a reliability estimating step 64, a combination of three base stations defining a triangle within which the tentative position is included is selected, and estimated positions are calculated relative to the selected three base stations. Data of an estimated position containing a large error is discarded and only the selected estimated positions are averaged at a spatial averaging step 65.

At a selecting step 63, if it is found that one of the plurality of estimated positions is separated by 200 m or more from an average position of the other estimated positions, the one estimated position is not regarded as a tentative position. The selecting step 63 therefore contributes to a further reduction in an error of an estimated position. The adoption of the selecting step 63 alone would prove effective in reducing an error.

The preliminary position locating step 62 may be omitted. In this case, at the reliability estimating step 64, it is judged whether each of estimated positions calculated at the position locating step 66 resides within a triangle defined by three base stations relative to which the estimated position is calculated. An estimated position that does not resides within the triangle is discarded. Even in this way, an estimated position containing a large error can be discarded successfully. At the spatial averaging step 65, estimated positions selected at the reliability estimating step 64 are used to calculate a spatial average, whereby the final estimated position of the terminal is calculated.

If an estimated position resides within a triangle defined by three selected base stations, it is assured that an error contained in the estimated position falls within a certain error. Therefore, the one estimated position may be displayed for shortening a calculation time, depending on the tolerance of the error designated by a position measuring person.

An example of a method of checking if an estimated position resides within a triangle will be described below.

Figure 5:
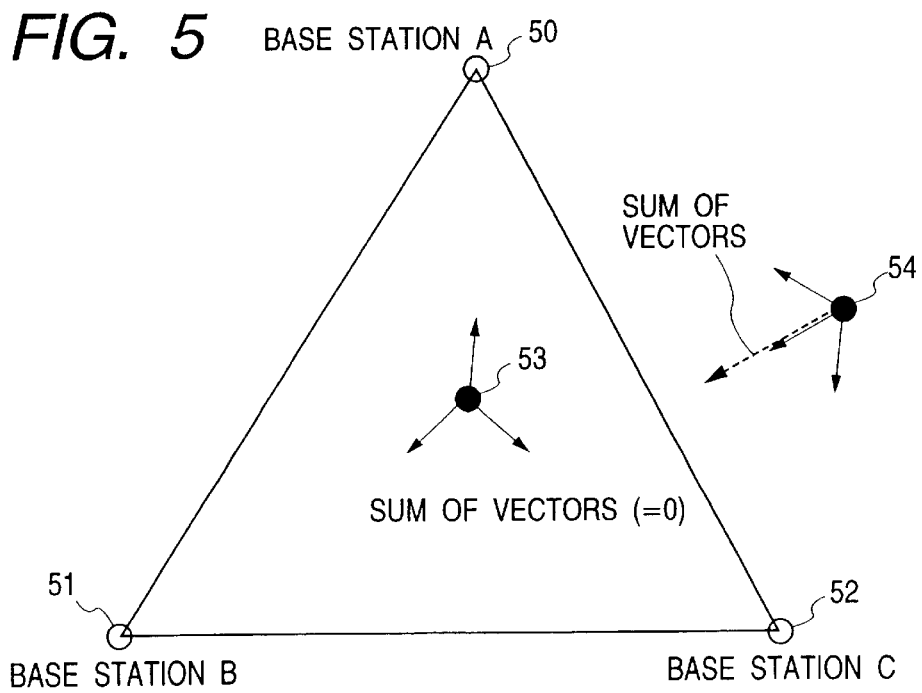
FIG. 5 is a conceptual diagram concerning the present invention.

As shown in FIG. 5, a unit vector is originated from a tentative position (X0, Y0) towards base stations (XA, YA), (XB, YB), and (XC, YC). The vectors are expressed as follows:

(XA–X0, YA–Y0)/|(XA|X0, YA–Y0)|
 (vector towards base station A)
(XB–X0, YB–Y0)/|(XB–X0, YB–Y0)|
 (vector towards base station B)
(XC–X0, YC–Y0)/|(XC–X0, YC–Y0)|
 (vector towards base station C)

The sum of the vectors is calculated. When the length of the resultant vector is 1 or more, the tentative position is judged to lie outside a triangle defined by the base stations. When the length of the resultant vector is less than 1, the tentative position is judged to lie within the triangle.

The foregoing processing employed in the present embodiment may be implemented in the form of not only software in the CPU but also hardware. When the processing is implemented in the form of hardware, the processing time must be shortened.

Figure 7:
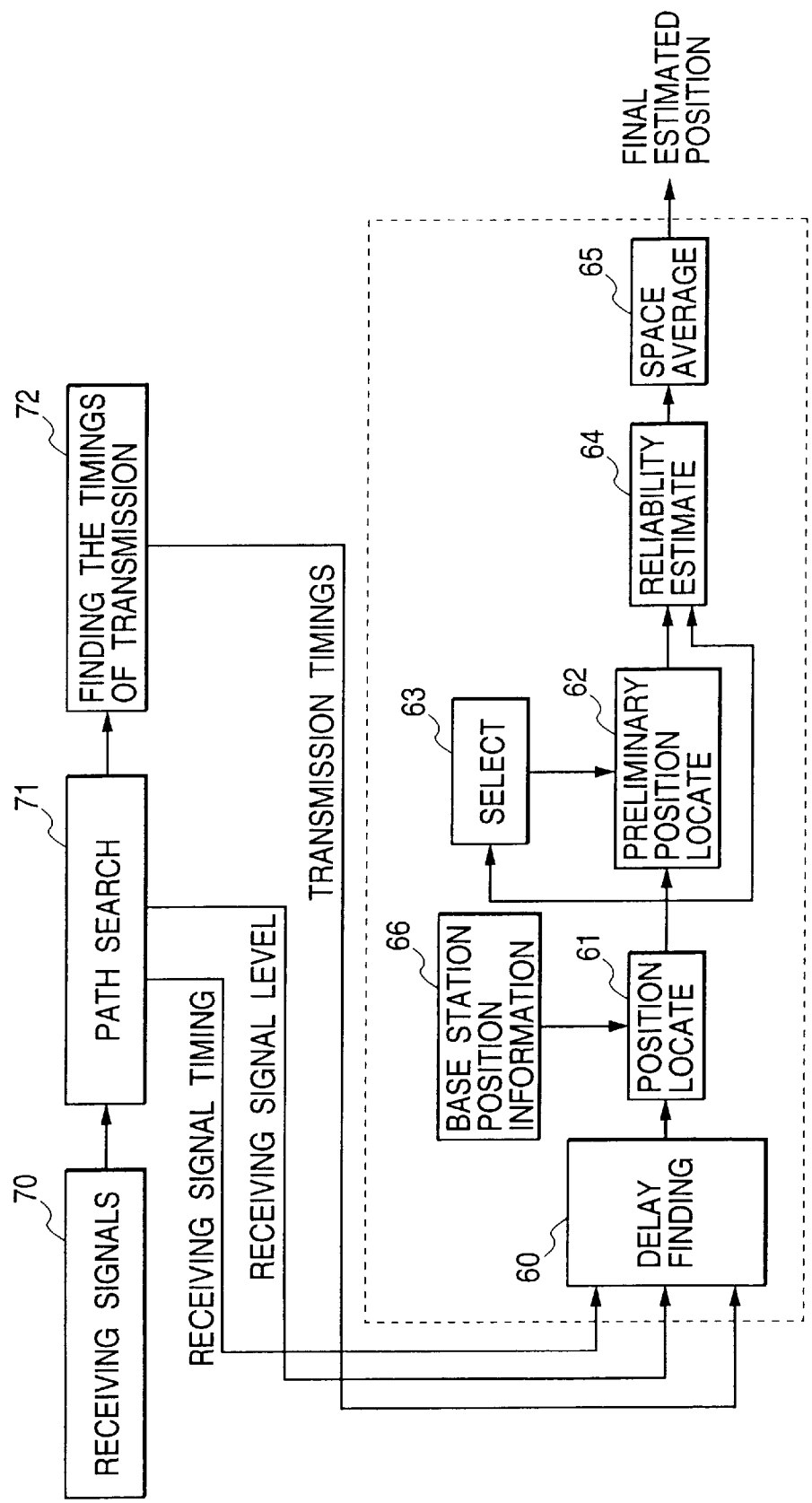
FIG. 7 shows a flowchart concerning the first embodiment of the present invention.

FIG. 7 describes an overall processing flow.

(1) Signals sent from base stations are received at step 70.

(2) The received signals are correlated with the patterns of specific codes in order to calculate the timings of receiving the signals from the base stations at step 71.

(3) Signals sent from the base stations are received and transmission timing is calculate at step 72.

(4) The triangulation and reliability estimation are used in combination in order to calculate a final estimated position at steps 60 to 65.

The steps 60 to 65 indicate the processing performed by the CPU as described in FIG. 6. According to this sequence, it is able to overcome the aforementioned problem.

In the present embodiment, precision in an estimated position is judged by employing the reliability estimation in which it is checked if the sum of unit vectors originated from a tentative position towards base stations is equal to or smaller than 1.

The gist of the present invention is to select an estimated position containing a small error for exerting the advantages of the present invention. A procedure of selecting an estimated position according to whether the sum of vectors is equal to or smaller than a certain value is therefore included in the present invention. If a threshold value for selecting the estimated position is made small, precision can be improved. However, since the number of selected estimated positions decreases in this case, the advantage of averaging is degraded.

According to the above embodiment of the invention, when the number of base stations that can be observed increases, the number $_nC_3$ of estimated positions increases, suddenly. This leads to a drastic increase in the amount of data to be calculated at the position locating step 61. Therefore, it is advantageous to provide in the signal processor 4 shown in FIG. 1, a means for notifying the delay finding step 60 shown in FIG. 6 of not only the timings of receiving signals but also the intensities of the received signals. At the delay finding step 60, the amount of data to be calculated can be reduced effectively by discarding low-grade received signals whose levels are equal to or lower than a certain level. Alternatively, k base stations may be selected according to whether signals received from the base stations have the first to k-th highest levels.

In cellular communication, such a base station may be implemented that is segmented into a plurality of sectors by a directional antenna and each of the sectors can transmit a signal as if they were serving as independent base stations. A plurality of signals sent from the sectors cannot be regarded as a plurality of signals to be handled according to the triangulation method. One of the received signals is therefore selected. A terminal is informed in advance of position information of base stations, and can therefore identify a plurality of base stations located at the same place as a sector type of base station. By estimating delays of the signals sent from the sectors and selecting one of the sectors sending a signal with the smallest delay, the selected signal may be expected as a signal that has propagated along a straight line leading to the terminal.

According to the present invention, when the position of a terminal is estimated using a cellular communication system, a combination of base stations employed for utilizing the triangulation method can be selected optimally. Consequently, the position of the terminal can be estimated highly precisely.

What is claimed is:

1. A wireless terminal position measuring method for estimating the position of a terminal using signals sent from at least three base stations accommodated by a cellular communication system, comprising:

a first step of selecting three base stations arbitrarily and estimating the position of the terminal according to the triangulation method;

a second step of selecting estimated positions whose estimation error satisfies a predetermined condition from among a plurality of estimated positions calculated relative to various combinations of base stations in the first step; and a third step of calculating a spatial average of the selected estimated positions, wherein in said second step, said estimated positions are selected by judging whether the sum of three unit vectors, which are originated from each of the estimated positions towards three base stations, has a length that is equal to or smaller than a certain length.

2. A wireless terminal, comprising:

a position location apparatus for arbitrarily selecting three base stations accommodated by a cellular communication system, and calculating estimated positions of the terminal using signals sent from the three base stations according to the triangulation method;

a judging apparatus for selecting estimated positions whose estimation error satisfies a predetermined condition from among a plurality of estimated positions calculated by the position location apparatus relative to various combinations of base stations; and an averaging apparatus for calculating a spatial average of the plurality of estimated positions selected by the judging apparatus, wherein said judging apparatus includes a vector judgment apparatus for selecting estimated positions out of the plurality of estimated position by judging whether the sum of three unit vectors originated from each of the estimated positions towards three base stations has a length that is equal to or smaller than a certain length, and said averaging apparatus calculates a spatial average of estimated positions selected by said vector judgment apparatus.

* * * * *